US012694113B1

(12) United States Patent
Elmi et al.

(10) Patent No.: US 12,694,113 B1
(45) Date of Patent: Jul. 28, 2026

(54) THIRD PARTY REAL-TIME SECURITY AND COMPLIANCE MONITORING PLATFORM

(71) Applicant: DRATA INC., San Diego, CA (US)

(72) Inventors: Brian S. Elmi, San Diego, CA (US); Ross W. Hosman, Colorado Springs, CO (US); Adam R. Markowitz, Carlsbad, CA (US); Daniel Zev Marashlian, San Diego, CA (US)

(73) Assignee: DRATA INC., San Diego, CA (US)

( * ) Notice: Subject to any disclaimer, the term of this patent is extended or adjusted under 35 U.S.C. 154(b) by 590 days.

(21) Appl. No.: 17/898,294

(22) Filed: Aug. 29, 2022

(51) Int. Cl.
    *G06F 21/57* (2013.01)

(52) U.S. Cl.
    CPC ...... *G06F 21/57* (2013.01); *G06F 2221/2101* (2013.01); *G06F 2221/2115* (2013.01)

(58) Field of Classification Search
    CPC ............. G06F 21/57; G06F 2221/2101; G06F 2221/2115
    USPC ............................................................ 726/1
    See application file for complete search history.

(56) References Cited

U.S. PATENT DOCUMENTS

| | | | | |
|---|---|---|---|---|
| 2018/0357419 A1* | 12/2018 | Lee | .......................... | G06F 21/57 |
| 2021/0056082 A1* | 2/2021 | Hegde | ..................... | G06F 21/57 |
| 2022/0368719 A1* | 11/2022 | May | ................... | H04L 63/0853 |
| 2023/0328086 A1* | 10/2023 | Kapoor | .............. | H04L 63/1425 |

OTHER PUBLICATIONS

Kavanagh, "Magic Quadrant for Security Information and Event Management", Feb. 2020, Gartner, pp. 1-42 (Year: 2020).*
Dalal, "Implementing Robust Cybersecurity Strategies for Safeguarding Critical Infrastructure and Enterprise Networks", Feb. 2024, IJMTE, pp. 90-110 (Year: 2024).*

* cited by examiner

*Primary Examiner* — Taghi T Arani
*Assistant Examiner* — Gregory A Lane

(57) ABSTRACT

Third party real-time security and compliance monitoring including receiving, by a security and compliance monitor, a request from a vendor client for a security and compliance framework report for a vendor; generating, in real-time by the security and compliance monitor, the security and compliance framework report for the vendor, including: retrieving, by the security and compliance monitor, control status responses from a group of services providers of the vendor, wherein each control status response is associated with an element of the security and compliance framework report; and determining, by the security and compliance monitor based on the control status responses, a compliance status for the elements of the security and compliance framework report; and providing, to the vendor client by the security and compliance monitor, the security and compliance framework report generated in real-time.

18 Claims, 7 Drawing Sheets

THIRD PARTY REAL-TIME SECURITY AND COMPLIANCE MONITORING PLATFORM

DESCRIPTION OF EMBODIMENTS

Many businesses employ external service providers to perform various aspects of the business's operations. At the same time, businesses are increasingly subject to regulations and standards that require specific procedures to be followed and documented. As businesses continue to expand utilization of cloud-based systems and services, the need for monitoring the security, privacy, and confidentiality of data that passes through or is stored on the third-party systems and services also increases.

Figure 1:
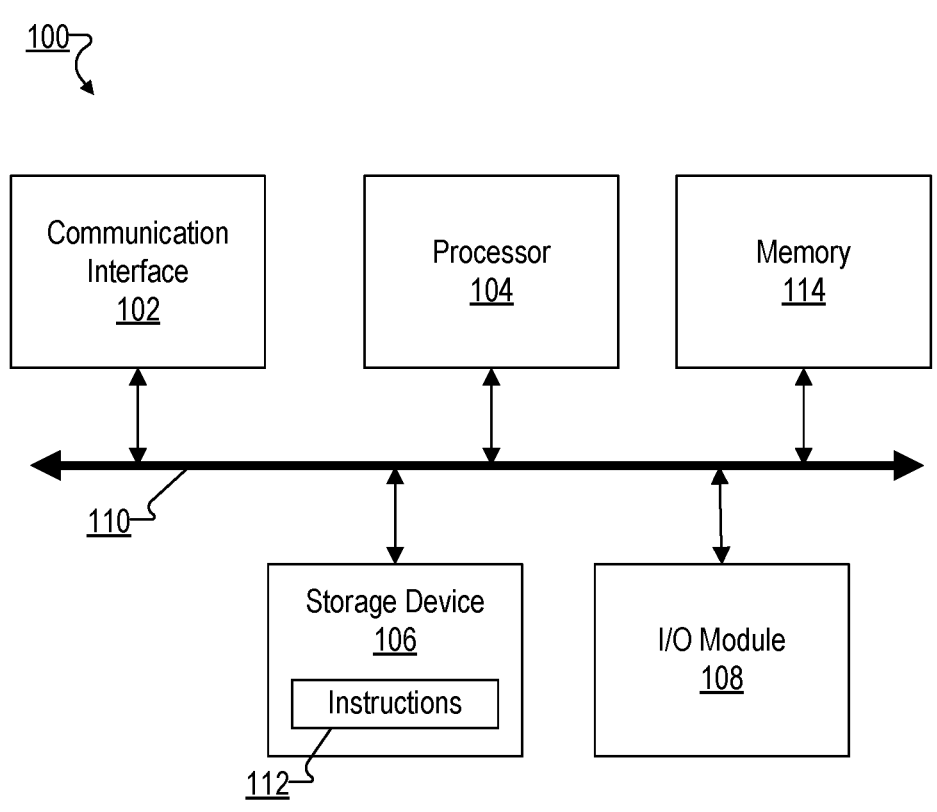
FIG. 1 illustrates an example computing device for security and compliance monitoring in accordance with some implementations.

Example methods, apparatus, and products for third party real-time security and compliance monitoring in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, an input/output (I/O) module 108, and computer memory 114 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
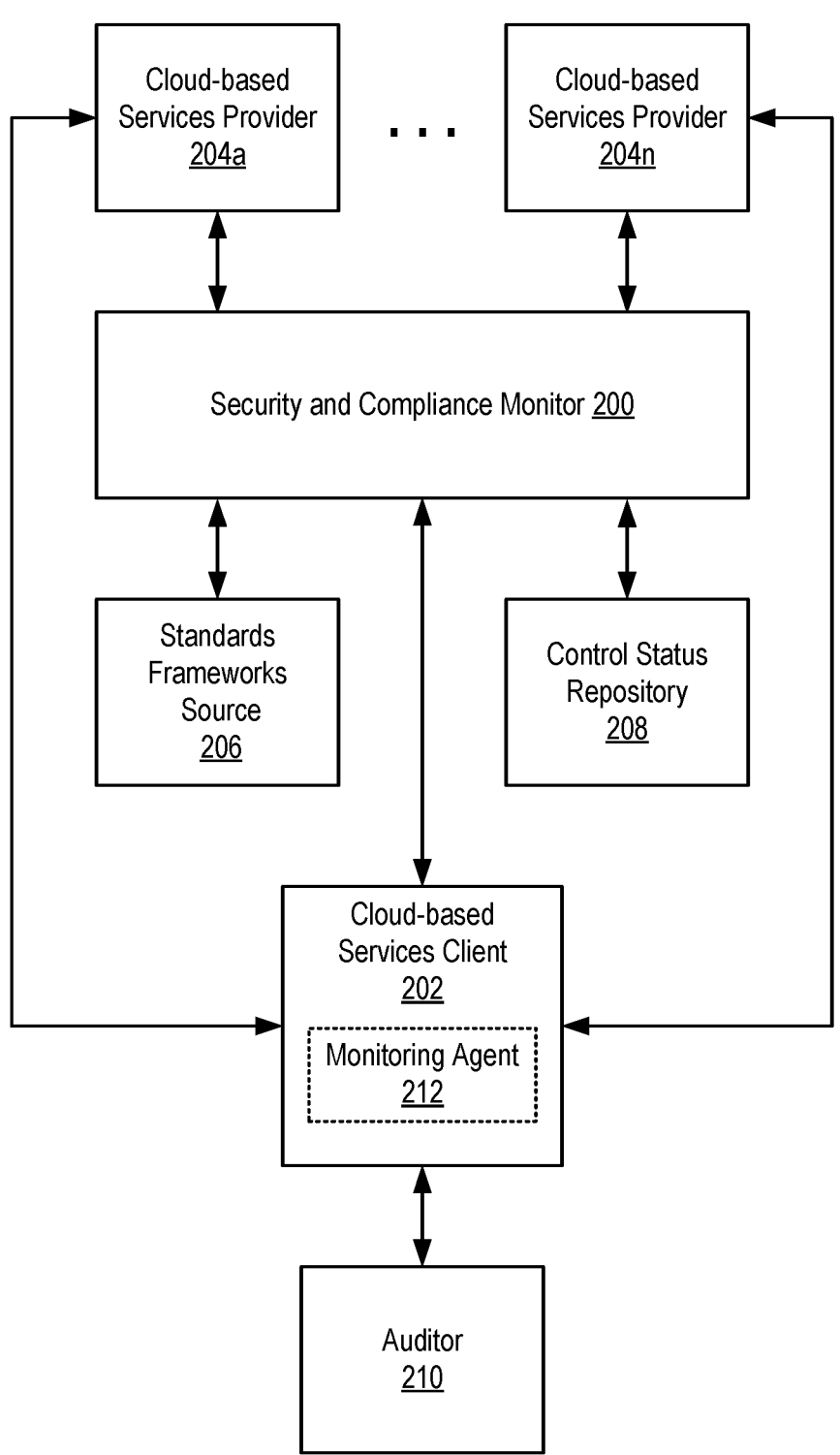
FIG. 2 illustrates an example system for security and compliance monitoring in accordance with some implementations.

For further explanation, FIG. 2 illustrates an exemplary block diagram depicting an end-to-end security and compliance automation platform for security and compliance monitoring in accordance with some embodiments of the present disclosure. The system of FIG. 2 includes a security and compliance monitor 200, a cloud-based services client 202, multiple cloud-based services providers 204a, 204n, a standards framework source 206, a control status repository 208, and an auditor 210. The cloud-based services client 202 optionally includes a monitoring agent 212. Each element presented may be hosted by a computing system (not shown). Specifically, the security and compliance monitor 200 may be hosted by a security and compliance monitor computing system, the cloud-based services client 202 may be hosted by a cloud-based services client computing system, each cloud-based services providers 204a, 204n may be hosted by a cloud-based services provider computing system, the standards framework source 206 may be hosted by a standards framework source computing system, the control status repository 208 may be hosted by a control status repository computing system, and the auditor 210 may be hosted by an auditor computing system.

The security and compliance monitor 200 is hardware, software, or an aggregation of hardware and software configured to determine a degree to which a cloud-based services client 202 is complying with a particular security and compliance framework. Specifically, the security and compliance monitor 200 monitors a set of controls for service providers that support the cloud-based services client 202. Each control monitored by the security and compliance monitor 200 is associated with at least one element of a security and compliance framework. The security and compliance monitor 200 uses the status of each control to compile a report detailing the compliance status of the cloud-based services client 202 with regard to the security and compliance framework.

The cloud-based services client 202 is an entity that utilizes the services provided by the cloud-based services providers 204a, 204n. The cloud-based services client 202 may be an enterprise or organization that itself provides a service or product to other clients utilizing the collection of services supplied by the cloud-based services providers 204a, 204n. For example, the cloud-based services client 202 may be a software developer that utilizes cloud-based services including cloud-based storage, cloud-based development tools, cloud-based ticketing, and cloud-based human resources.

The cloud-based services client 202 may be a "cloud-native" enterprise or organization that creates products using cloud-based services providers 204a, 204n. The cloud-based services client 202 may be "cloud-first" and exclusively utilize computing resources, applications, and systems provided by cloud-based services providers 204a, 204n for some or all aspects of the enterprise or organization. Regardless of the level of reliance on cloud-based services providers 204a, 204n, in order to be in full compliance with any legally- or operationally-required frameworks, the cloud-based services client 202 must verify that each cloud-based services providers 204a, 204n is operating in a manner consistent with those frameworks.

The cloud-based services client 202 may utilize other services that are not cloud-based services (relative to the cloud-based services client 202). Specifically, the cloud-based services client 202 may include services (e.g., enterprise productivity suites, virtualization software, etc.) provided by other entities and hosted on computing systems under the control of cloud-based services client 202. For such services, the security and compliance monitor 200 sends the control status requests 308 to the computing systems of the cloud-based services client 202 instead of a third-party computing system.

The monitoring agent 212 is hardware, software, or an aggregation of hardware and software configured to retrieve the control status responses on behalf of the security and compliance monitor 200. The monitoring agent 212 may be optionally utilized in circumstances in which the security and compliance monitor 200 is unable to retrieve the control status responses directly. For example, a particular cloud-based service provider may require that control status requests originate from the cloud-based services client 202. The monitoring agent 212 may also be configured to retrieve the control status responses from services that are not cloud-based.

The monitoring agent 212 may receive instructions from the security and compliance monitor 200 and, in response, send a control status request to one or more cloud-based services provider 204a, 204n. Alternatively, the monitoring agent 212 may send control status requests to one or more cloud-based services provider 204a, 204n based on a predefined schedule (e.g., every six hours, etc.). Once retrieved, the monitoring agent 212 may be configured to forward the control status response to the security and compliance monitor 200.

As discussed above, the cloud-based services client 202 is an entity obligated to abide by standards frameworks for legal and/or business purposes. A standards framework (also referred to as a security and compliance framework) defines procedures that must be followed, tracked, and documented in order to comply with the particular law or standard around which the framework has been constructed. Many standards frameworks describe the manner in which customer or employee data must be managed. Other standards frameworks describe the disclosure or training obligations to employees or customers.

Each standards framework may be composed of human-readable text detailing the obligations of the entity to be in compliance with the standards framework. Each obligation includes one or more elements to satisfy the obligation. The elements of the standards framework may be explicit from the text or derivable based on the text. For example, one obligation of a framework may dictate that, when stored, user data must be encrypted using a specified minimum standard. Two elements for this obligation may therefore be that the data must be encrypted and that the encryption level must conform to at least the specified minimum standard. Each element of the standards framework is associated with a control. A control is a measurable component exposed by a services provider. Continuing with the example, a first control may be whether or not the user data is encrypted and a second control may be the level of encryption employed.

The standards framework source 206 is a system that provides updated standards frameworks to the security and compliance monitor 200. The standards framework source 206 may be part of or work in conjunction with the business or regulatory body that defines the standards framework. The standards framework source 206 may provide the standards framework as human-readable text or a list of obligations. Alternatively, the standards framework source 206 may derive the elements or controls from the standards framework and provide the elements or controls to the security and compliance monitor 200. If the standards framework source 206 provides the standards framework as human-readable text or a list of obligations, then the security and compliance monitor 200 itself may derive the elements or controls from the standards framework.

The control status repository 208 is storage for control statuses. The control status repository 208 may be a storage system within the security and compliance monitor 200 or may be a storage system utilized by the security and compliance monitor 200. The control status repository 208 may be a cloud-based data warehouse or other system hosting a database that contains the control statuses.

A control status is the state of the control retrieved from the services provider (e.g., cloud-based services providers 204a, 204n). The control status may be a Boolean response (i.e., true or false), a selection from a group (e.g., low, medium, or high), or some other form of data. The control status is retrieved from the services provider using a control status request and control status response (described in further detail below in reference to FIG. 3).

The cloud-based services providers 204a, 204n are entities that supply a resource or product to the cloud-based services client 202 over a wide-area network. Each cloud-based services provider 204a, 204n may include a collection of computer systems working in concert to provide the resource or product over the Internet (examples of which are described below in reference to FIG. 3). In addition to providing the resource or product, each cloud-based services provider 204a, 204n also exposes an interface allowing the security and compliance monitor 200 or monitoring agent 212 to retrieve control statuses from the services provider 204a, 204n.

The auditor 210 is system under the control of an entity tasked with the inspection of an organizations' processes and records to ensure the entity (i.e., the cloud-based services client 202) is in compliance with a particular framework or group of frameworks. The auditor 210 may initially request the report which triggers the cloud-based services client 202 to request that the security and compliance monitor 200 generate the standards framework report (by obtaining the control statuses from the cloud-based services providers 204a, 204n). Once the standards framework report is compiled, the security and compliance monitor 200 sends, via the cloud-based services client 202, the report to the auditor 210.

Figure 3:
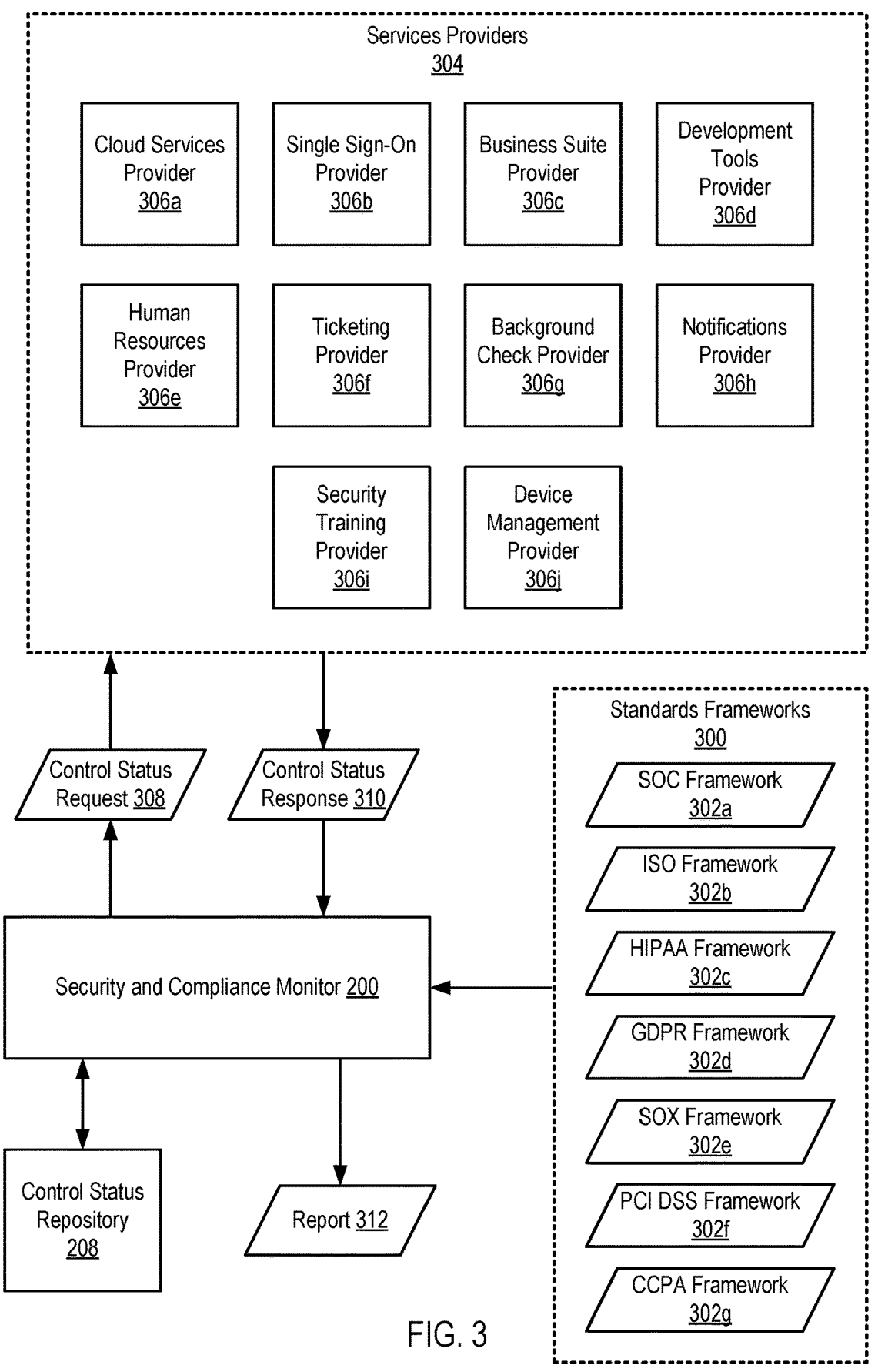
FIG. 3 illustrates an example system for security and compliance monitoring in accordance with some implementations.

For further explanation, FIG. 3 illustrates an exemplary block diagram depicting a system for security and compliance monitoring in accordance with some embodiments of the present disclosure. Specifically, the system of FIG. 3 includes details of the interactions between the security and compliance monitor 200, service providers 304, and standards frameworks 300.

The service providers 304 in FIG. 3 include a cloud services provider 306a, a single sign-on provider 306b, business suite provider 306c, a development tools provider 306d, a human resources provider 306e, a ticketing provider 306f, a background check provider 306g, a notifications provider 306h, a security training provider 306i, and a device management provider 306j.

A cloud services provider 306a is a supplier of a cloud-based platform, infrastructure, application or storage services. Examples of controls for cloud services providers 306a include frequency of data backups, level of data security, and location of stored data. A single sign-on provider 306b is a supplier of authentication across multiple third party applications. Examples of controls for single sign-on providers include access controls, level of access for each user, and role-level security. A business suite provider 306c is a supplier of business applications for communications and data operations across and within businesses. Examples of controls for business suite providers include customer data handling, data access controls, and communications data security. A development tools provider 306d is a supplier of applications that allow developers to create, test and debug software. Examples of controls for development tools providers include customer data handling, best practices implementations, and data access controls. A human resources provider 306e is a supplier of employee management software and services. Examples of controls for human resources providers include employee data security and employee safety metrics. A ticketing provider 306f is a supplier of applications and services for addressing information technology issues. Examples of controls for ticketing providers include data access controls, employee data security, and customer data security. A background check provider 306g is a supplier of services to review potential employee's criminal, commercial and financial records. Examples of controls for background check providers include employee data security and potential employee data security. A notifications provider 306h is a supplier of communications applications for an enterprise environment. Examples of controls for notifications providers include employee data security and communications data security. A security training provider 306i is supplier of training systems for enterprise employees. Examples of controls for security training providers include training completion level for each employee, and employee data security. A device management provider 306j is a supplier of services that control data, configuration settings and applications on all devices used within an enterprise. Examples of controls for device management providers include device security, device access controls, and employee data security. As discussed above, the services providers may include services that are not cloud-based services.

The standards frameworks 300 in FIG. 3 include a System and Organization Controls (SOC) framework 302a, an International Organization for Standardization (ISO) framework 302b, a Health Insurance Portability and Accountability Act (HIPAA) framework 302c, a General Data Protection Regulation (GDPR) framework 302d, a Sarbanes-Oxley Act (SOX) framework 302e, a Payment Card Industry Data Security Standard (PCI DSS) framework 302f, and a California Consumer Privacy Act (CCPA) framework 302g.

The SOC framework 302a (also sometimes referred to as service organizations controls) as defined by the American Institute of Certified Public Accountants (AICPA), is the name of a suite of reports produced during an audit. It is intended for use by service organizations (organizations that provide information systems as a service to other organizations) to issue validated reports of internal controls over those information systems to the users of those services. The reports focus on controls grouped into five categories called Trust Service Principles, including Security, Availability, Confidentiality, and Privacy.

The ISO framework 302b is a group of information security standards published jointly by the International Organization for Standardization (ISO) and the International Electrotechnical Commission (IEC). ISO 27000 provides best practice recommendations on information security management (the management of information risks through information security controls) within the context of an overall Information security management system (ISMS), similar in design to management systems for quality assurance (the ISO 9000 series), environmental protection (the ISO 14000 series) and other management systems.

The HIPPA framework 302c is built around a U.S. law that specifies the flow of healthcare information and stipulates how personally identifiable information maintained by the healthcare and healthcare insurance industries should be protected from fraud and theft. HIPPA generally prohibits healthcare providers and healthcare businesses, called covered entities, from disclosing protected information to anyone other than a patient and the patient's authorized representatives without their consent. Technical safeguards are specified and must be followed to be in compliance with HIPAA. Such technical safeguards specify controls for accessing computer systems and protecting data communications, among other controls.

The GDPR framework 302d is built around a regulation in European law on data protection and privacy in the European Union and the European Economic Area. The GDPR is a component of EU privacy law and of human rights law, in particular Article 8 of the Charter of Fundamental Rights of the European Union.

The SOX framework 302e is built around a U.S. law that mandates certain practices in financial record keeping and reporting. Section 404 of the SOX regulation requires organizations to implement internal controls to ensure their financial reporting is accurate. SOX controls, also known as SOX 404 controls, are rules that can prevent and detect errors in a company's financial reporting process. Internal controls are used to prevent or discover problems in organizational processes, ensuring the organization achieves its goals. Amongst other controls, SOX requires that all financial reports include an Internal Controls Report. This report should show that the company's financial data is accurate (a 5% variance is permitted) and that appropriate and adequate controls are in place to ensure that the data is secure.

The PCI DSS framework 302f is an information security standard for organizations that handled credit cards schemes. Card schemes are payment networks linked to payment cards, such as debit or credit cards, of which a bank or any other eligible financial institution can become a member. By becoming a member of the scheme, the member then gets the possibility to issue cards or acquire merchants operating on the network of that card scheme. Visa and MasterCard are two of the largest global brands, known as card schemes, or card brands. PCI DSS sets standard controls for merchants to meet minimum levels of security for storing, processing, and transmitting cardholder data.

The CCPA framework 302g is built around a California state statute intended to enhance privacy rights and consumer protection for residents of California, United States.

As discussed above, each framework is composed of elements that, when satisfied, indicate compliance with the particular framework. Whether the element is satisfied is determined by retrieving a status of the associated control from the particular services provider 304. Obtaining the control statuses may be performed using control status requests 308 and control status responses 310. A control status request 308 is a message targeting a particular services provider 304 requesting information about a control. The control status request 308 may include code that instructs the particular services provider 304 to generate a control status response 310. A control status response 310 is a message that describes the state of a particular control within the services provider 304. The control status responses 310 may be in the form of state specifications. A state specification is a collection of data that conveys data objects from one system to another. The state specification may be a standard file format used to exchange data in asynchronous browser-server communication. For example, the state specification may be a JavaScript Object Notation specification.

The framework report 312 is the collection of control statuses that correspond to the elements of a particular standards framework. The framework report 312 conveys to the auditor the compliance state of the services client. The report 312 may be provided in response to a request by an auditor or services client. Further, the report 312 may be generated in response to regulatory obligations or as a condition of a particular business agreement.

Figure 4:
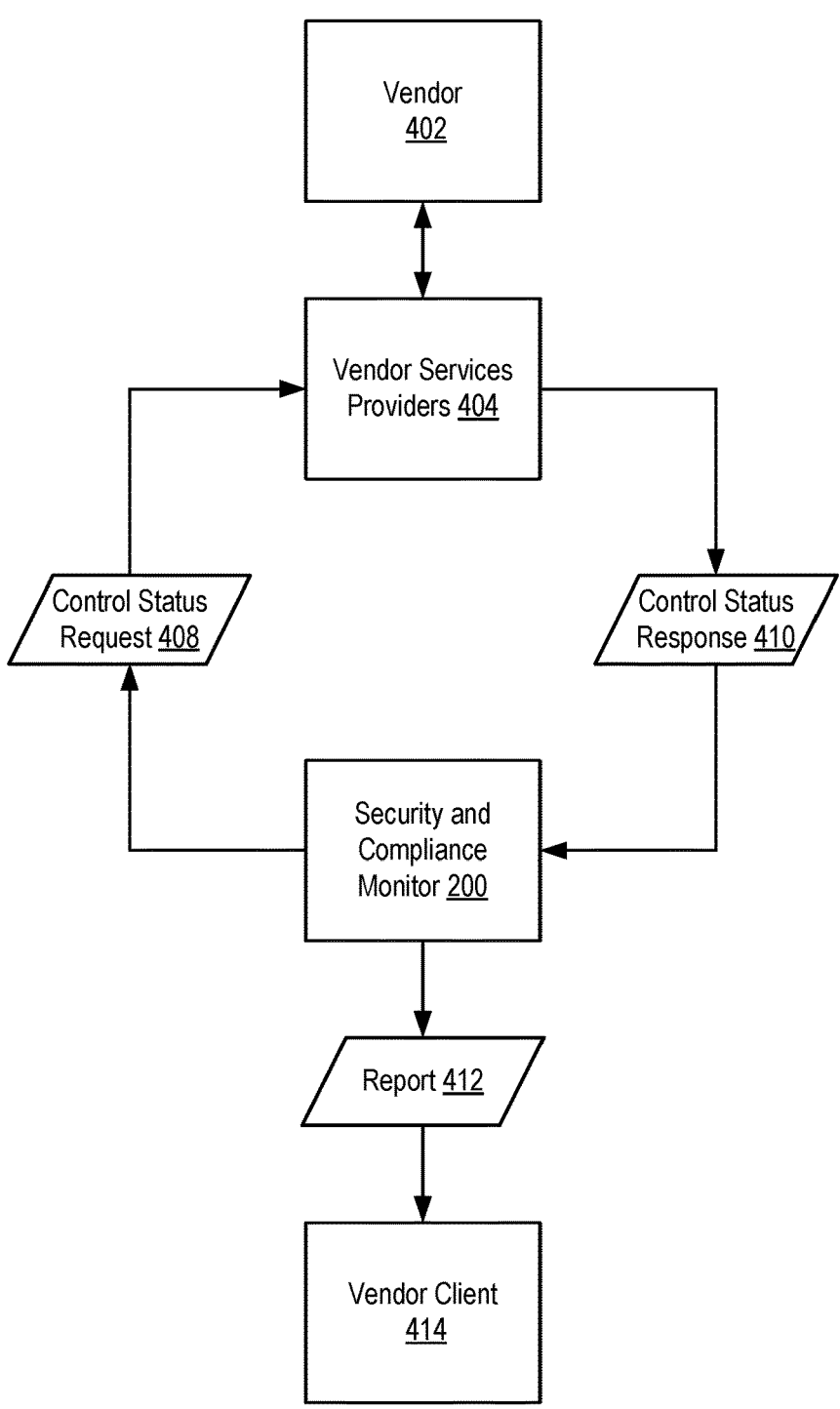
FIG. 4 illustrates an example system for third party real-time security and compliance monitoring in accordance with some implementations.

For further explanation, FIG. 4 illustrates an exemplary block diagram depicting a system for security and compliance monitoring in accordance with some embodiments of the present disclosure. Specifically, the system of FIG. 4 is an embodiment of the system for security and compliance monitoring in which a vendor 402 supplies a framework standards report 412 to a vendor client 414.

Large enterprises often employ vendors to provide various services to the enterprise. For example, a multinational bank may employ vendors to provide credit card transaction processing, data backup, productivity applications, and employee training. Such large enterprises (i.e., vendor clients) must ensure that each vendor complies with the necessary standards frameworks in order to protect itself from liability. In turn, each vendor also employs services providers in furtherance of providing its own service to the enterprise. In order to efficiently demonstrate compliance with the necessary standards frameworks, the vendor 402 may employ the security and compliance monitor 200 to generate the standards framework report on the vendors 402 behalf.

As shown in FIG. 4, the example system includes a vendor 402, vendor services providers 404, the security and compliance monitor 200, and the vendor client 414. The security and compliance monitor 200 sends control status requests 408 to the vendor services providers 404 and receives control status responses 410 from the vendor services providers 404. The security and compliance monitor 200 generates the report 412 and provides the report 412 to a vendor client 414. The system of FIG. 4 is an example configuration of FIG. 2 in which the vendor 402 is the services client and employs the security and compliance monitor 200 to generate the report 412 for the vendor client 414.

While particular combinations of various functions and features of the one or more embodiments are expressly described herein, other combinations of these features and functions are likewise possible. The present disclosure is not limited by the particular examples disclosed herein and expressly incorporates these other combinations. For further explanation, FIG. 5 sets forth a flow chart illustrating an exemplary method for third party real-time security and compliance monitoring according to embodiments of the present disclosure. Although depicted in less detail, the system may include some or all of the components described above. The example method depicted in FIG. 5 includes receiving 502, by a security and compliance monitor 200, a request 520 from a vendor client 414 for a security and compliance framework report 412 for a vendor. Receiving 502 a request 520 from a vendor client 414 for a security and compliance framework report 412 for a vendor may be carried out by the vendor client 414 accessing a network location (such as a website) that initiates the generation of the request 520. The network location may be managed by the vendor but enable the vendor client 414 to request 520 the report 412 from the security and compliance monitor 200.

The request 520 may be received via the vendor in response to the vendor receiving a request from the vendor client 414 for the report. Specifically, the vendor client 414 may require constant or periodic review of the security and compliance framework report 412 for the vendor. In response and at the required intervals, the vendor may initiate the generation of the security and compliance framework report 412.

Receiving 502 a request 520 from a vendor client 414 for a security and compliance framework report 412 for a vendor may include receiving authorization from the vendor to provide the security and compliance framework report 412 to the vendor client. Once the security and compliance monitor 200 receives the request 520 from the vendor client 414, the security and compliance monitor 200 may ensure that the vendor client 414 has been authorized by the vendor to receive the security and compliance framework report 412. Authorization may include the vendor granting the vendor client 414 access to the location at which the security and compliance framework report 412 will be stored. Authorization may also include the vendor providing the vendor client 414 with a password or token used to access the security and compliance framework report 412 once generated. The vendor client 414 may then provide the password or token to the security and compliance monitor 200 for access to the report 412.

Figure 5:
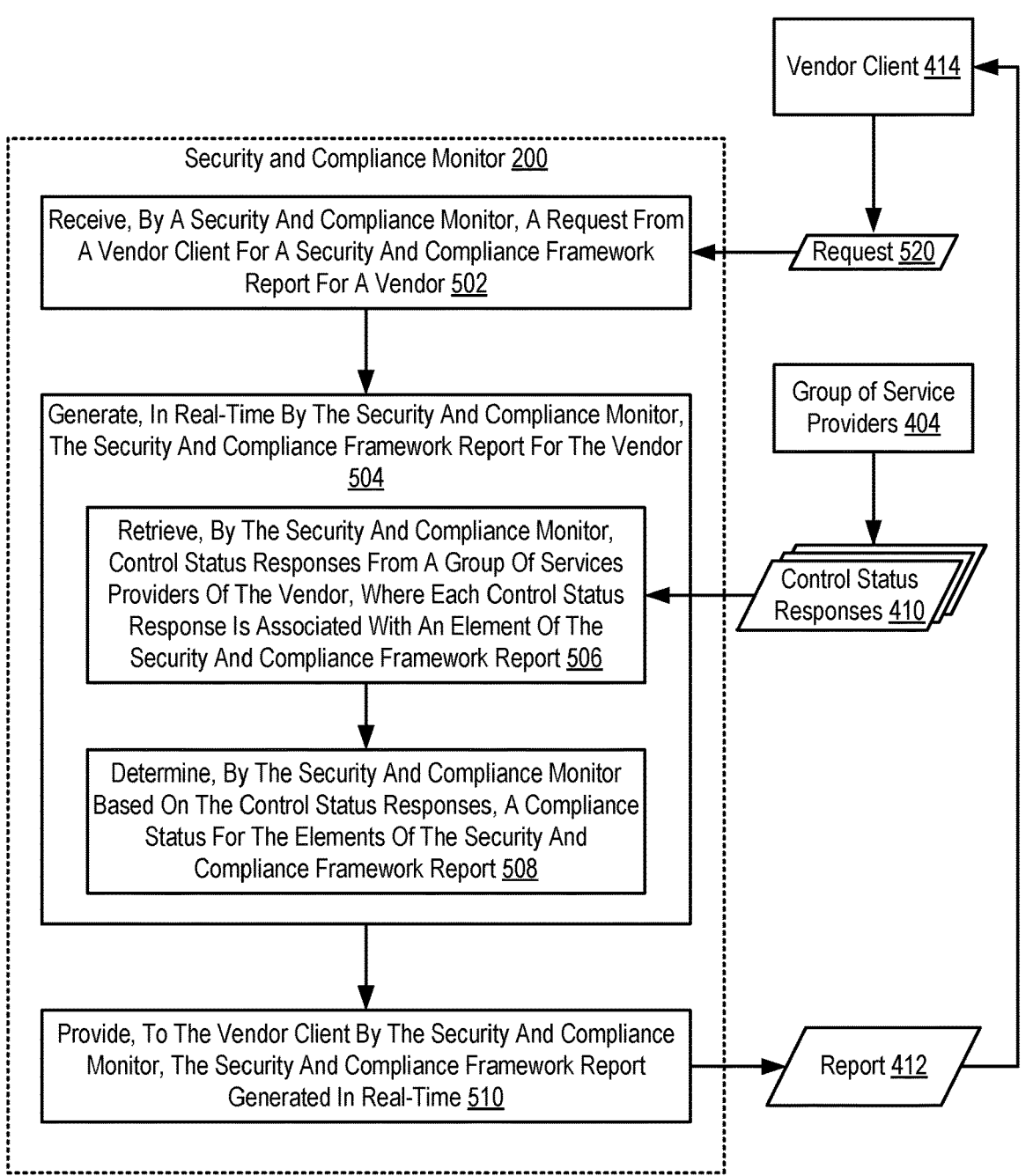
FIG. 5 sets forth a flow chart illustrating an exemplary method for third party real-time security and compliance monitoring according to embodiments of the present disclosure.

The example method depicted in FIG. 5 also includes generating 504, in real-time by the security and compliance monitor 200, the security and compliance framework report 412 for the vendor. Generating 504, in real-time, the security and compliance framework report 412 for the vendor may be carried out by receiving authorization from the vendor to access the group of services providers. Specifically, the group of service providers 404 may each require the security and compliance monitor 200 to be authorized before providing the control status response 410. Therefore, the security and compliance monitor 200 may obtain authorization from the vendor to access the necessary data on each of the group of service providers 404 in order to retrieve the control status response 410. The authorization may be in the form of a password or token provided from the vendor to the security and compliance monitor 200. Once the authorization mechanism is obtained, the security and compliance monitor 200 uses the authorization to retrieve the control status response 410.

Generating 504, in real-time by the security and compliance monitor 200, the security and compliance framework report 412 for the vendor includes retrieving 506, by the security and compliance monitor 200, control status responses 410 from a group of services providers 404 of the vendor, wherein each control status response 410 is associated with an element of the security and compliance framework report 412. Retrieving 506 the control status responses 410 from a group of services providers 404 of the vendor may be carried out by issuing a control status request to the group of services providers and receiving, in response, the control status responses 410. The control status requests may be commands submitted via a command line interface exposed by the services providers. The control status responses 410 may be state specifications provided in response to the submitted commands.

Generating 504, in real-time by the security and compliance monitor 200, the security and compliance framework report 412 for the vendor also includes determining 508, by the security and compliance monitor 200 based on the control status responses 410, a compliance status for the elements of the security and compliance framework report 412. Determining 508, based on the control status responses 410, the compliance status for the elements of the security and compliance framework report 412 may be carried out by translating the control status responses 410 into the compliance statuses for the elements of the security and compliance framework report 412. The security and compliance monitor 200 may extract the control statuses from the control status responses 410 and convert the control statuses into a compliance status for the report element. Converting the control statuses into a compliance status for the report element may include comparing the control status to a value (such as a minimum or maximum value allowed) for compliance with the framework.

For example, for one control status, the security and compliance monitor 200 may generate a command requesting the frequency of data backups performed on a particular data set. The security and compliance monitor 200 may then send the command to a cloud services provider via a command line interface. In response, the security and compliance monitor 200 may receive a state specification detailing that the particular data set is backed up once a day. The security and compliance monitor 200 may then extract the frequency of once a day from the control status response and compare that value with the minimum value for compliance with the framework. If the frequency of once a day is at least as frequent as required by the framework, then the compliance status for that element would be "in compliance".

Generating the report 412 in real-time means that the generated report 412 includes the most recently retrieved control status. Generating the report 412 in real-time may also mean that the report 412 is generated dynamically upon receiving the request 520 for the report 412. Accordingly, generating 504, in real-time, the security and compliance framework report 412 for the vendor may include retrieving the control status responses from the group of services providers of the vendor after receiving the request 520 for the security and compliance framework report 412 is received. Specifically, the generation of the security and compliance framework report 412 may begin only after the request 520 has been received (as opposed to having the report 412 generated and ready to provide before the request 520 is received). Generating the report 412 in real-time means that some or all of the control statuses in the report 412 are accurately represented as of the time the request 520 is received (notwithstanding the time spent retrieving the control statuses). Some control statuses that indicate a failure to comply with the framework may be delayed according to a service level agreement, as described below in reference to FIG. 7. Once generated, security and compliance framework report 412 may be stored in a secure location, such as a control status repository.

The example method depicted in FIG. 5 also includes providing 510, to the vendor client 414 by the security and compliance monitor 200, the security and compliance framework report 412 generated in real-time. Providing 510, to the vendor client 414, the security and compliance framework report 412 generated in real-time may be carried out by sending the security and compliance framework report 412 to the vendor client 414 directly. For example, the security and compliance framework report 412 may be sent to the vendor via a secure messaging platform. Alternatively, the vendor may be sent a network address identifying a location at which the security and compliance framework report 412 is stored.

The generated security and compliance framework report 412 provided to the vendor client 414 may include visual presentation that lists each element of the security and compliance framework report 412 and an associated indication of compliance status. For example, if a particular element is in full compliance, the indicator next to the particular element may be green. If the particular element is in partial compliance, the indicator next to the particular element may be yellow. Finally, if the particular element is not in compliance, the indicator next to the particular element may be red.

Providing 510, to the vendor client 414, the security and compliance framework report 412 may include granting the vendor client access to a storage location (such as a database) that includes the security and compliance framework report 412. The vendor client may be authorized by the vendor and/or the security and compliance monitor 200 to access the storage location containing the security and compliance framework report 412. The authorization may be in the form of a password or token provided to the vendor client. Alternatively, an ID associated with the vendor client may be granted permission to access the security and compliance framework report 412.

Providing 510, to the vendor client 414, the security and compliance framework report 412 generated in real-time may be carried out by the security and compliance monitor 200 providing a plurality of security and compliance framework reports 412 from a group of vendors of the vendor client 414. The vendor client 414 may be presented with an interface that includes the reports 412 (or portions of the reports) from multiple vendors that provide services to the vendor client 414. Such an interface may also allow the vendor client 414 to explore and manipulate the data provided in the report 412.

As an example of the above method, assume that a multinational corporation has thousands of vendors including a UX firm that designs application interfaces for the corporation. The UX firm has previously employed the security and compliance monitor 200 to automate compliance checks for its own services providers, and has agreed to make the compliance report data available to the corporation. A corporate employee tasked with reviewing the compliance state of each vendor may access a cloud-based application provided by the security and compliance monitor 200. The corporate employee may be presented with a list of vendors and a summary of the compliance status of each vendor and each required framework. The corporate employee may select the UX firm from the list of vendors triggering the request for the security and compliance framework report 412. In response to the request, the security and compliance monitor 200 generates the security and compliance framework report 412 by retrieving each control status of the required frameworks for each of the UX firm's service providers (e.g., cloud-based storage providers, human resources providers, etc.). Once retrieved, the control statuses are used to determine the compliance status for each required framework. The resulting framework reports are then presented, via the interface, to the corporate employee.

In addition to providing the security and compliance framework report 412, the security and compliance monitor 200 may take action based on the security and compliance framework report 412. For example, the security and compliance monitor 200 may generate an alert if an element of a framework is not in compliance, and send the alert to the vendor, vendor client, or services provider from which the non-compliant element was detected. As another example, the security and compliance monitor 200 may take corrective action by altering the control to be in compliance if that control corresponds to a correctable setting (e.g., increasing the frequency of data backups to be in compliance with a framework).

Figure 6:
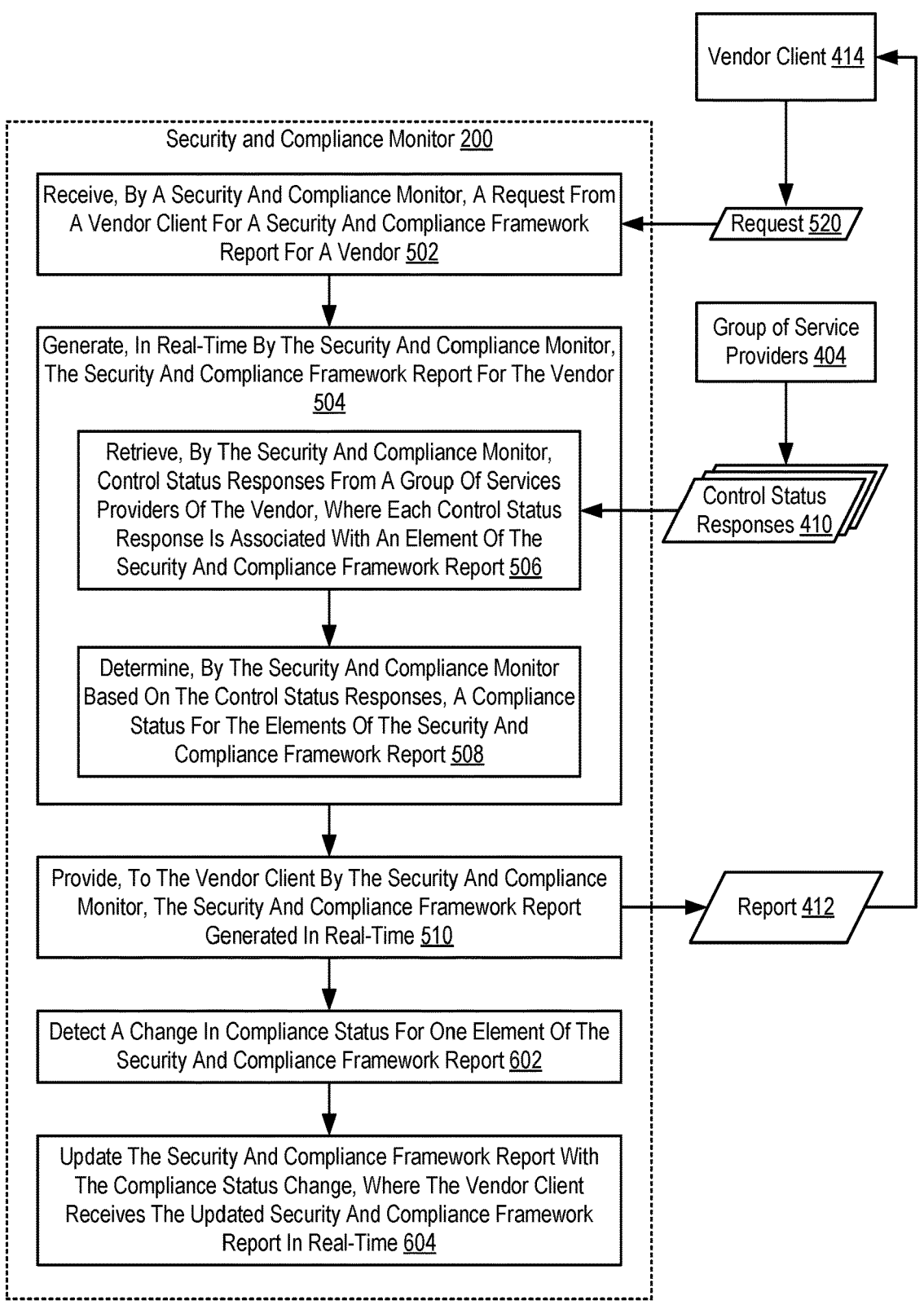
FIG. 6 sets forth a flow chart illustrating an exemplary method for third party real-time security and compliance monitoring according to embodiments of the present disclosure.

For further explanation, FIG. 6 sets forth a flow chart illustrating a further exemplary method for third party real-time security and compliance monitoring according to embodiments of the present disclosure that includes receiving 502, by a security and compliance monitor 200, a request 520 from a vendor client 414 for a security and compliance framework report 412 for a vendor; generating 504, in real-time by the security and compliance monitor 200, the security and compliance framework report 412 for the vendor, including: retrieving 506, by the security and compliance monitor 200, control status responses 410 from a group of services providers 404 of the vendor, wherein each control status response 410 is associated with an element of the security and compliance framework report 412; and determining 508, by the security and compliance monitor 200 based on the control status responses 410, a compliance status for the elements of the security and compliance framework report 412; and providing 510, to the vendor client 414 by the security and compliance monitor 200, the security and compliance framework report 412 generated in real-time.

However, the example method depicted in FIG. 6 differs from the method of FIG. 5 in that the method of FIG. 6 further includes detecting 602 a change in compliance status for one element of the security and compliance framework report 412; and updating 604 the security and compliance framework report 412 with the compliance status change, wherein the vendor client 414 receives the updated security and compliance framework report 412 in real-time.

Once the security and compliance framework report 412 is presented to the vendor client 414 (e.g., via an interface on a website), the security and compliance monitor 200 may continually or periodically update each control status with updated control status responses. Detecting 602 a change in compliance status for one element of the security and compliance framework report 412 may be carried out by retrieving subsequent control status responses from each services provider. As the subsequent control status responses are retrieved, each subsequent control status response may be compared to the initial control status response to determine whether the control status has changed. If the control statuses do not match, then a change in compliance status for the associated element of the security and compliance framework report 412 is detected.

Updating 604 the security and compliance framework report 412 with the compliance status change may be carried out by the security and compliance monitor 200 replacing an indicator within the security and compliance framework report 412 with an indicator that reflects the changed compliance status. The indicator replacement may occur in real time during the visual presentation of the report 412.

Figure 7:
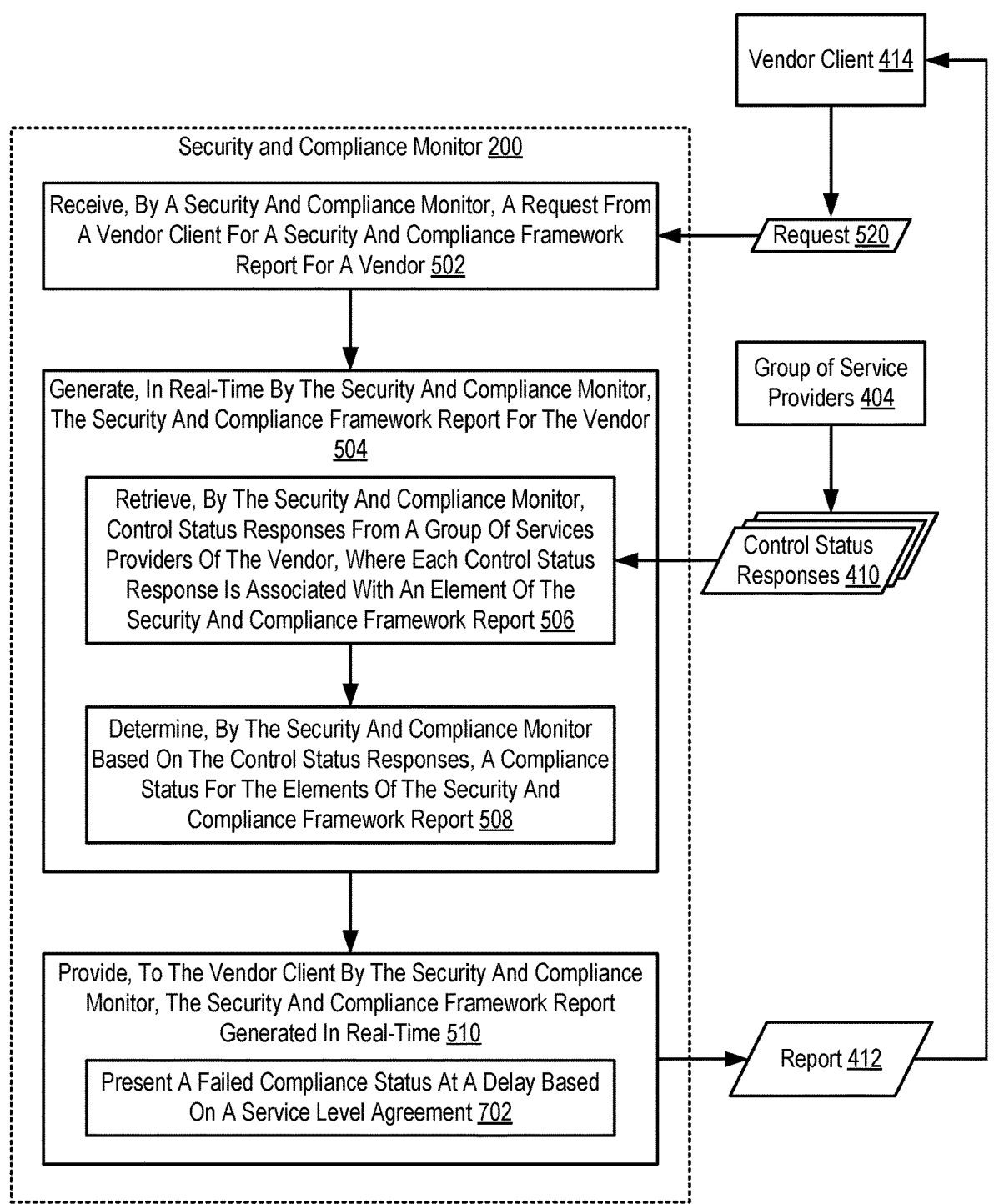
FIG. 7 sets forth a flow chart illustrating an exemplary method for third party real-time security and compliance monitoring according to embodiments of the present disclosure.

For further explanation, FIG. 7 sets forth a flow chart illustrating a further exemplary method for third party real-time security and compliance monitoring according to embodiments of the present disclosure that includes receiving 502, by a security and compliance monitor 200, a request 520 from a vendor client 414 for a security and compliance framework report 412 for a vendor; generating 504, in real-time by the security and compliance monitor 200, the security and compliance framework report 412 for the vendor, including: retrieving 506, by the security and compliance monitor 200, control status responses 410 from a group of services providers 404 of the vendor, wherein each control status response 410 is associated with an element of the security and compliance framework report 412; and determining 508, by the security and compliance monitor 200 based on the control status responses 410, a compliance status for the elements of the security and compliance framework report 412; and providing 510, to the vendor client 414 by the security and compliance monitor 200, the security and compliance framework report 412 generated in real-time.

However, the example method depicted in FIG. 7 differs from the method of FIG. 5 in that providing 510, to the vendor client 414 by the security and compliance monitor 200, the security and compliance framework report 412 generated in real-time includes presenting 702 a failed compliance status at a delay based on a service level agreement. A service level agreement (SLA) is a contract between a services provider and a services client that documents the services the provider will supply and defines the service standards the provider is obligated to meet. A vendor client 414 may agree to an SLA in which the vendor need not immediately update a failed compliance status. Instead, the vendor client 414 and vendor may agree to a grace period (i.e., a delay) during which the vendor may attempt to resolve the issue causing the failed compliance status. Presenting 702 a failed compliance status at a delay based on a service level agreement may be carried out by determining that the failed compliance status has not been addressed during the delay and presenting the failed compliance status in an updated security and compliance framework report 412 provided to the vendor client 414 upon the expiration of the delay.

Advantages and features of the present disclosure can be further described by the following statements:

1. A method of third party real-time security and compliance monitoring, the method comprising: receiving, by a security and compliance monitor, a request from a vendor client for a security and compliance framework report for a vendor; generating, in real-time by the security and compliance monitor, the security and compliance framework report for the vendor, including: retrieving, by the security and compliance monitor, control status responses from a group of services providers of the vendor, wherein each control status response is associated with an element of the security and compliance framework report; and determining, by the security and compliance monitor based on the control status responses, a compliance status for the elements of the security and compliance framework report; and providing, to the vendor client by the security and compliance monitor, the security and compliance framework report generated in real-time.

2. The method of statement 1, further comprising: detecting a change in compliance status for one element of the security and compliance framework report; and updating the security and compliance framework report with the compliance status change, wherein the vendor client receives the updated security and compliance framework report in real-time.

3. The method of statement 2 or statement 1, wherein providing, to the vendor client, the security and compliance framework report generated in real-time comprises presenting a failed compliance status at a delay based on a service level agreement.

4. The method of statement 3, statement 2, or statement 1, wherein retrieving the control status responses from the group of services providers of the vendor comprises receiving authorization from the vendor to access the group of services providers.

5. The method of statement 4, statement 3, statement 2, or statement 1, wherein retrieving the control status responses from the group of services providers of the vendor comprises issuing a control status request to the group of services providers and receiving, in response, the control status response.

6. The method of statement 5, statement 4, statement 3, statement 2, or statement 1, wherein receiving the request from a vendor client for the security and compliance framework report for a vendor comprises receiving authorization from the vendor to provide the security and compliance framework report to the vendor client.

7. The method of statement 6, statement 5, statement 4, statement 3, statement 2, or statement 1, wherein providing, to the vendor client, the security and compliance framework report generated in real-time comprises granting the vendor client access to a storage location that includes the security and compliance framework report.

8. The method of statement 7, statement 6, statement 5, statement 4, statement 3, statement 2, or statement 1, wherein generating, in real-time, the security and compliance framework report for the vendor further comprises retrieving the control status responses from the group of services providers of the vendor after receiving the request for the security and compliance framework report is received.

9. The method of statement 8, statement 7, statement 6, statement 5, statement 4, statement 3, statement 2, or statement 1, wherein the control status response comprises a state specification.

10. The method of statement 9, statement 8, statement 7, statement 6, statement 5, statement 4, statement 3, statement 2, or statement 1, wherein the group of services providers comprise a cloud services provider.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of third party real-time security and compliance monitoring, the method comprising:

receiving, by a security and compliance monitor, a request from a vendor client for a security and compliance framework report for a vendor, wherein the security and compliance framework report comprises a plurality of elements indicative of a compliance status, wherein the vendor client and the vendor are separate entities, and wherein the vendor employs the security and compliance monitor to generate the security and compliance framework report on behalf of the vendor;

generating, by the security and compliance monitor in real-time dynamically upon receiving the request, the security and compliance framework report for the vendor, including:

retrieving, by the security and compliance monitor, control status responses from a group of services providers of the vendor, wherein each control status response describes a state of a particular control within a services provider from the group of services providers of the vendor and is associated with an element within the plurality of elements of the security and compliance framework report, and wherein retrieving the control status responses from the group of services providers of the vendor comprises issuing a control status request to the group of services providers and receiving, in response, the control status response; and determining, by the security and compliance monitor based on the control status responses, the compliance status for each element within the plurality of elements of the security and compliance framework report; and providing, to the vendor client by the security and compliance monitor, the security and compliance framework report generated in real-time.

2. The method of claim 1, further comprising:

detecting a change in compliance status for one element of the security and compliance framework report; and updating the security and compliance framework report with the compliance status change, wherein the vendor client receives the updated security and compliance framework report in real-time.

3. The method of claim 1, wherein providing, to the vendor client, the security and compliance framework report generated in real-time comprises presenting a failed compliance status at a delay based on a service level agreement.

4. The method of claim 1, wherein retrieving the control status responses from the group of services providers of the vendor comprises receiving authorization from the vendor to access the group of services providers.

5. The method of claim 1, wherein receiving the request from a vendor client for the security and compliance framework report for a vendor comprises receiving authorization from the vendor to provide the security and compliance framework report to the vendor client.

6. The method of claim 1, wherein providing, to the vendor client, the security and compliance framework report generated in real-time comprises granting, to the vendor client, access to a storage location that includes the security and compliance framework report.

7. The method of claim 1, wherein generating, in real-time, the security and compliance framework report for the vendor further comprises retrieving the control status responses from the group of services providers of the vendor after receiving the request for the security and compliance framework report.

8. The method of claim 1, wherein the control status response comprises a state specification.

9. The method of claim 1, wherein the group of services providers comprise a cloud services provider.

10. An apparatus for third party real-time security and compliance monitoring, the apparatus comprising a computer processor, a computer memory operatively coupled to the computer processor, the computer memory comprising computer program instructions that, when executed by the computer processor, cause the apparatus to carry out:

receiving a request from a vendor client for a security and compliance framework report for a vendor, wherein the security and compliance framework report comprises a plurality of elements indicative of a compliance status, wherein the vendor client and the vendor are separate entities, and wherein the vendor employs the security and compliance monitor to generate the security and compliance framework report on behalf of the vendor;

generating, in real-time dynamically upon receiving the request, the security and compliance framework report for the vendor, including:

retrieving control status responses from a group of services providers of the vendor, wherein each control status response describes a state of a particular control within a services provider from the group of services providers of the vendor and is associated with an element within the plurality of elements of the security and compliance framework report, and wherein retrieving the control status responses from the group of services providers of the vendor comprises issuing a control status request to the group of services providers and receiving, in response, the control status response; and determining, based on the control status responses, the compliance status for each element within the plurality of elements of the security and compliance framework report; and providing, to the vendor client, the security and compliance framework report generated in real-time.

11. The apparatus of claim 10, further comprising computer program instructions that, when executed by the computer processor, cause the apparatus to carry out:

detecting a change in compliance status for one element of the security and compliance framework report; and updating the security and compliance framework report with the compliance status change, wherein the vendor client receives the updated security and compliance framework report in real-time.

12. The apparatus of claim 10, wherein providing, to the vendor client, the security and compliance framework report generated in real-time comprises presenting a failed compliance status at a delay based on a service level agreement.

13. The apparatus of claim 10, wherein retrieving the control status responses from the group of services providers of the vendor comprises receiving authorization from the vendor to access the group of services providers.

14. The apparatus of claim 10, wherein receiving the request from a vendor client for the security and compliance framework report for a vendor comprises receiving authorization from the vendor to provide the security and compliance framework report to the vendor client.

15. The apparatus of claim 10, wherein providing, to the vendor client, the security and compliance framework report generated in real-time comprises granting the vendor client access to a storage location that includes the security and compliance framework report.

16. The apparatus of claim 10, wherein generating, in real-time, the security and compliance framework report for the vendor further comprises retrieving the control status responses from the group of services providers of the vendor after receiving the request for the security and compliance framework report.

17. The apparatus of claim 10, wherein the control status response comprises a state specification.

18. A computer program product for third party real-time security and compliance monitoring, the computer program product disposed upon a non-transitory computer readable medium, the computer program product comprising computer program instructions that, when executed, cause a computer to carry out:

receiving a request from a vendor client for a security and compliance framework report for a vendor, wherein the security and compliance framework report comprises a plurality of elements indicative of a compliance status, wherein the vendor client and the vendor are separate entities, and wherein the vendor employs the security and compliance monitor to generate the security and compliance framework report on behalf of the vendor;

generating, in real-time dynamically upon receiving the request, the security and compliance framework report for the vendor, including:

retrieving control status responses from a group of services providers of the vendor, wherein each control status response describes a state of a particular control within a services provider from the group of services providers of the vendor and is associated with an element within the plurality of elements of the security and compliance framework report, and wherein retrieving the control status responses from the group of services providers of the vendor comprises issuing a control status request to the group of services providers and receiving, in response, the control status response; and determining, based on the control status responses, the compliance status for each element within the plurality of elements of the security and compliance framework report; and providing, to the vendor client, the security and compliance framework report generated in real-time.

\* \* \* \* \*